United States Patent
Shiina et al.

(10) Patent No.: US 8,613,684 B2
(45) Date of Patent: Dec. 24, 2013

(54) CONTINUOUSLY VARIABLE TRANSMISSION

(75) Inventors: Takahiro Shiina, Susono (JP); Akira Murakami, Gotenba (JP); Hiroyuki Ogawa, Susono (JP); Daisuke Tomomatsu, Susono (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/996,469

(22) PCT Filed: Mar. 18, 2010

(86) PCT No.: PCT/JP2010/054702
§ 371 (c)(1),
(2), (4) Date: Dec. 6, 2010

(87) PCT Pub. No.: WO2011/114494
PCT Pub. Date: Sep. 22, 2011

(65) Prior Publication Data
US 2011/0230297 A1    Sep. 22, 2011

(51) Int. Cl.
*F16H 13/08* (2006.01)
(52) U.S. Cl.
USPC .............................. 475/196; 475/189; 476/36
(58) Field of Classification Search
USPC ................. 475/189, 196, 334; 476/36, 37, 38
See application file for complete search history.

(56) References Cited

U.S. PATENT DOCUMENTS

| | | | | |
|---|---|---|---|---|
| 2,469,653 A | * | 5/1949 | Kopp | 476/37 |
| 2,931,235 A | * | 4/1960 | Hayward | 476/1 |
| 7,011,600 B2 | | 3/2006 | Miller et al. | |
| 2001/0011049 A1 | * | 8/2001 | Miller | 476/38 |
| 2006/0084549 A1 | | 4/2006 | Smithson et al. | |
| 2009/0312145 A1 | | 12/2009 | Pohl et al. | |

FOREIGN PATENT DOCUMENTS

| | | |
|---|---|---|
| GB | 358840 | 10/1931 |
| JP | B1-42-25367 | 12/1967 |
| JP | B1-43-24617 | 10/1968 |
| JP | U-52-35481 | 3/1977 |
| JP | A-10-89435 | 4/1998 |

(Continued)

OTHER PUBLICATIONS

International Search Report dated Apr. 27, 2010 in corresponding International Application No. PCT/JP2010/054702 (with translation).

*Primary Examiner* — David D Le
*Assistant Examiner* — Mark Manley
(74) *Attorney, Agent, or Firm* — Oliff & Berridge, PLC

(57) ABSTRACT

A continuously variable transmission includes: first and second rotating elements that has a common first rotation axis; a planetary ball that is rotatably supported by a support shaft having a second rotation axis separate from the first rotation axis, and is sandwiched between the first rotation member and the second rotating member such that torque transmission is possible between them; grooves, etc., that permit change in a rotation ratio between the first and second rotating members by tilting and rolling the planetary ball; an inclined surface that pushes the support shaft in a direction opposite to the direction of tilt of the support shaft in accordance with spin moment occurring at the planetary ball when moving in an axial direction; and a thrust force transmitting section, such as a movable shaft, etc., by which radial thrust force applied from the planetary ball is transmitted to the inclined surface based on spin moment occurring at the planetary ball.

15 Claims, 5 Drawing Sheets

(56) References Cited

FOREIGN PATENT DOCUMENTS

| | | |
|---|---|---|
| JP | A-2002-139149 | 5/2002 |
| JP | A-2002-250421 | 9/2002 |
| JP | A-2008-516165 | 5/2008 |
| JP | A-2009-541663 | 11/2009 |
| WO | WO 2006/041718 A2 | 4/2006 |
| WO | WO 2008/002457 A2 | 1/2008 |

* cited by examiner

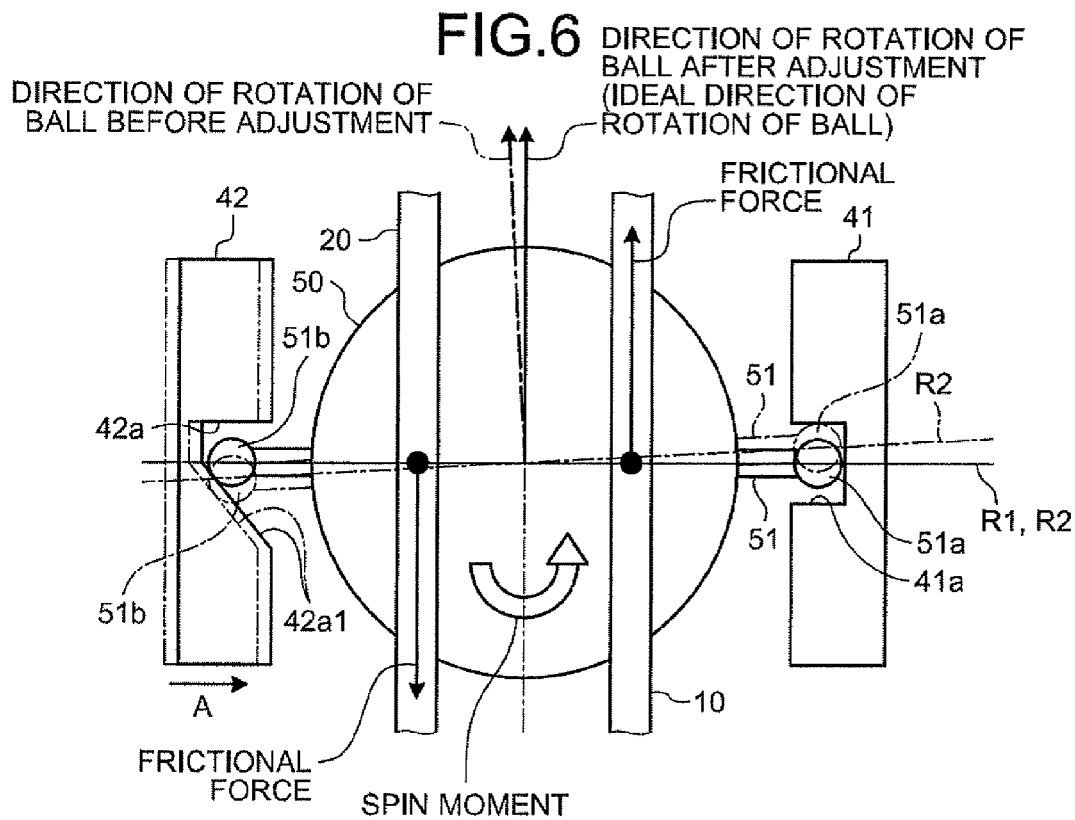
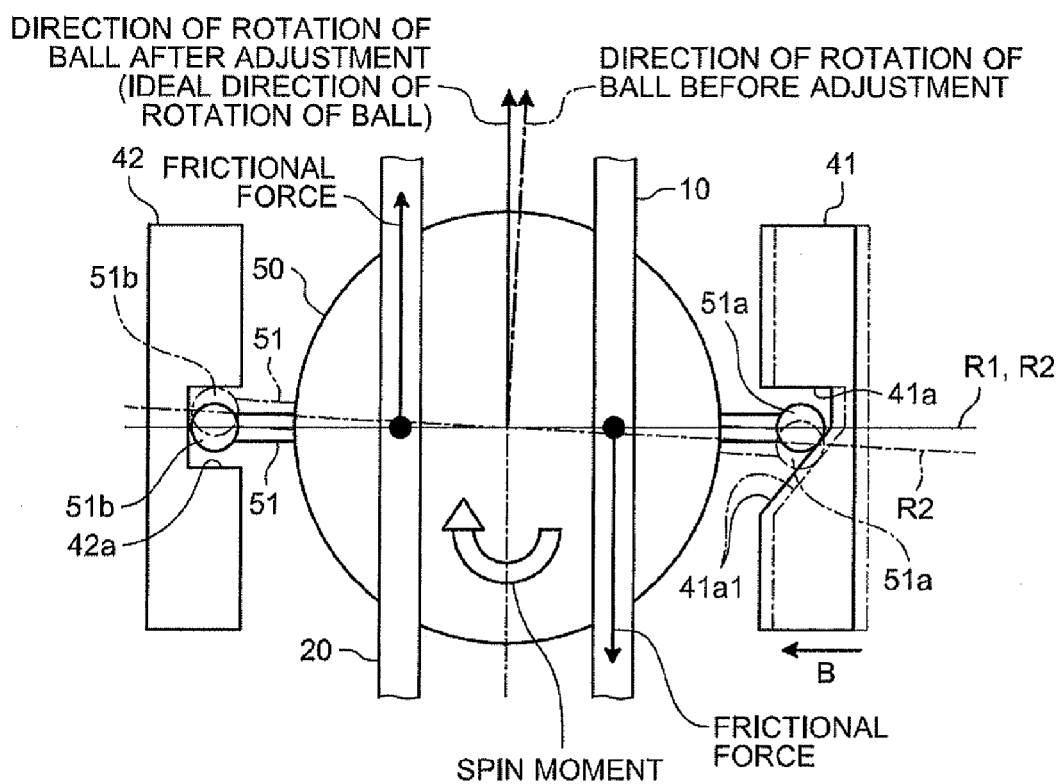

CONTINUOUSLY VARIABLE TRANSMISSION

FIELD

The present invention relates to a continuously variable transmission capable of steplessly changing rotating speed (the number of revolutions) between input and output.

BACKGROUND

Conventionally, a continuously variable transmission incorporating what is called a traction planetary mechanism is well known. The traction planetary mechanism includes: a plurality of rotating elements having a first rotation axis and arranged to be relatively rotatable; and a plurality of rolling members having a separate second rotation axis parallel to the first rotation axis and radially arranged around the first rotation axis. Each of the rolling members is sandwiched between a first rotating element and a second rotating element arranged opposite to each other, and is arranged on the outer surface of a third rotating element. A continuously variable transmission of this type changes the rotation ratio between the first rotating element and the second rotating element by tilting the rolling members, thereby steplessly changing rotating speed between input and output. For example, Patent Literature 1 described below discloses a continuously variable transmission of this type. In this transmission, a plurality of balls (rolling members) is radially arranged on the outer surface of a sun roller (third rotating element) and the balls are tilted by moving the sun roller in an axial direction.

Patent Literature 2 described below describes an operating mechanism for a shift fork which is provided with a block having a shift lever engagement groove for a manual transmission. By tilting one of the side surfaces of the engagement groove, the shift fork is prevented from pushing a sleeve at an angle.

CITATION LIST

Patent Literature

Patent Literature 1: Japanese National Publication of International Patent Application No. 2009-541663
Patent Literature 2: Japanese Patent Application Laid-open No. 2002-139149

SUMMARY

Technical Problem

In this type of continuously variable transmission, frictional force (traction force) occurs at a contact portion between each rotating member and the first and second rotating elements in mutually opposite directions. Then spin moment due to frictional force in the opposite direction occurs at the rolling member, since each of the contact portions is offset relative to the center of gravity of the rolling member. Generally, in a tilting and rolling mechanism for the rolling members, a clearance is provided between the members in order to make the tilting and rolling movement smooth. Therefore, each rolling member rotates by an amount corresponding to the clearance in the direction of spin moment. This may cause the rotation axis of the rolling member (second rotation axis) to shift in the direction of spin moment. The shifting leads to a shifting in the direction of rotation of the rolling member and in the direction of rotation of a third rotating element (sun roller). Accordingly, torque transmission efficiency may drop in a conventional continuously variable transmission of this type.

Therefore, it is an object of the present invention to provide a continuously variable transmission capable of suppressing drop in torque transmission efficiency by removing the drawbacks of the conventional continuously variable transmission described above.

Solution to Problem

In order to achieve the above mentioned object, a continuously variable transmission according to the present invention, includes first and second rotating elements that have a common first rotation axis and are arranged opposite to each other so as to be rotatable relative to each other; a rolling member that is rotatably supported by a support shaft having a second rotation axis separate from the first rotation axis, and is sandwiched between the first and second rotating elements such that torque transmission is possible between the first and second rotating elements; a transmission controlling section that changes a rotation ratio between the first and second rotating elements by tilting and rolling the rolling member; a pushing section that pushes the support shaft, when moving axial direction, in an opposite direction to a direction of tilt of the support shaft in accordance with spin moment occurring at the rolling member; and a thrust force transmitting section that transmits, to the pushing section, thrust force in the axial direction applied from the rolling member based on spin moment occurring at the pushing section.

Here, it is desirable that the pushing section pushes the support shaft such that the second rotation axis is adjusted so as to coincide with an ideal rotation axis before the spin moment occurs.

Here, it is desirable that the pushing section is a contact surface in which the pushing section is in contact with the support shaft tilted in order to be moved in a direction of the push.

Here, it is desirable that the thrust force transmitting section is relatively movable in an axial direction in accordance with the thrust force applied to the rolling member, and has a movable member capable of moving the pushing section integrally with the movable member in the axial direction.

It is desirable that the continuously variable transmission includes a third rotating element that has the first rotation axis, also has an outer circumferential surface serving as a rolling surface for a plurality of the rolling members radially arranged around the first rotation axis, and is rotatable relative to the first and second rotating elements; and a fourth rotating element that has the first rotation axis and is rotatable relative to the first to third rotating elements, and permits each of the rolling member to rotate around the first rotation axis, wherein any one of the first to fourth rotating elements is desirably arranged so as not to be rotatable around the first rotation axis.

Further, it is desirable that the pushing section is provided on a holding member that holds the rolling member via the support shaft.

Here, it is desirable that a holding member that holds the rolling member via the support shaft is provided with the pushing section, and the fourth rotating element has the holding member.

Advantageous Effects of Invention

In a continuously variable transmission according to the present invention, a pushing section to which thrust force has been transmitted can push back a support shaft in a direction opposite to the direction of tilt. The pushing section consequently causes a second rotation axis to be closer to or coincide with an ideal rotation axis, and hence causes the direction of rotation of a rolling member, which tilts in accordance with spin moment, to be closer to or coincide with an ideal direction of rotation. Accordingly, the continuously variable transmission can suppress drop in torque transmission efficiency by utilizing trust thrust force.

BRIEF DESCRIPTION OF DRAWINGS

FIG. 6 is a conceptual view illustrating major portions only as viewed from the direction of arrow X in FIG. 1, and shows statuses of a pushing section before and after operation.

FIG. 7 is a conceptual view illustrating major portions only as viewed from the direction of arrow X in FIG. 1, and shows statuses of the pushing section before and after operation when spin moment in the other direction occurs.

DESCRIPTION OF EMBODIMENTS

An embodiment of a continuously variable transmission according to the present invention will now be described in detail with reference to the drawings. It is to be understood that the invention is not limited to the embodiment thereof.

Embodiment

An embodiment of a continuously variable transmission according to the present invention will be described with reference to FIGS. 1 to 7.

Figure 1:
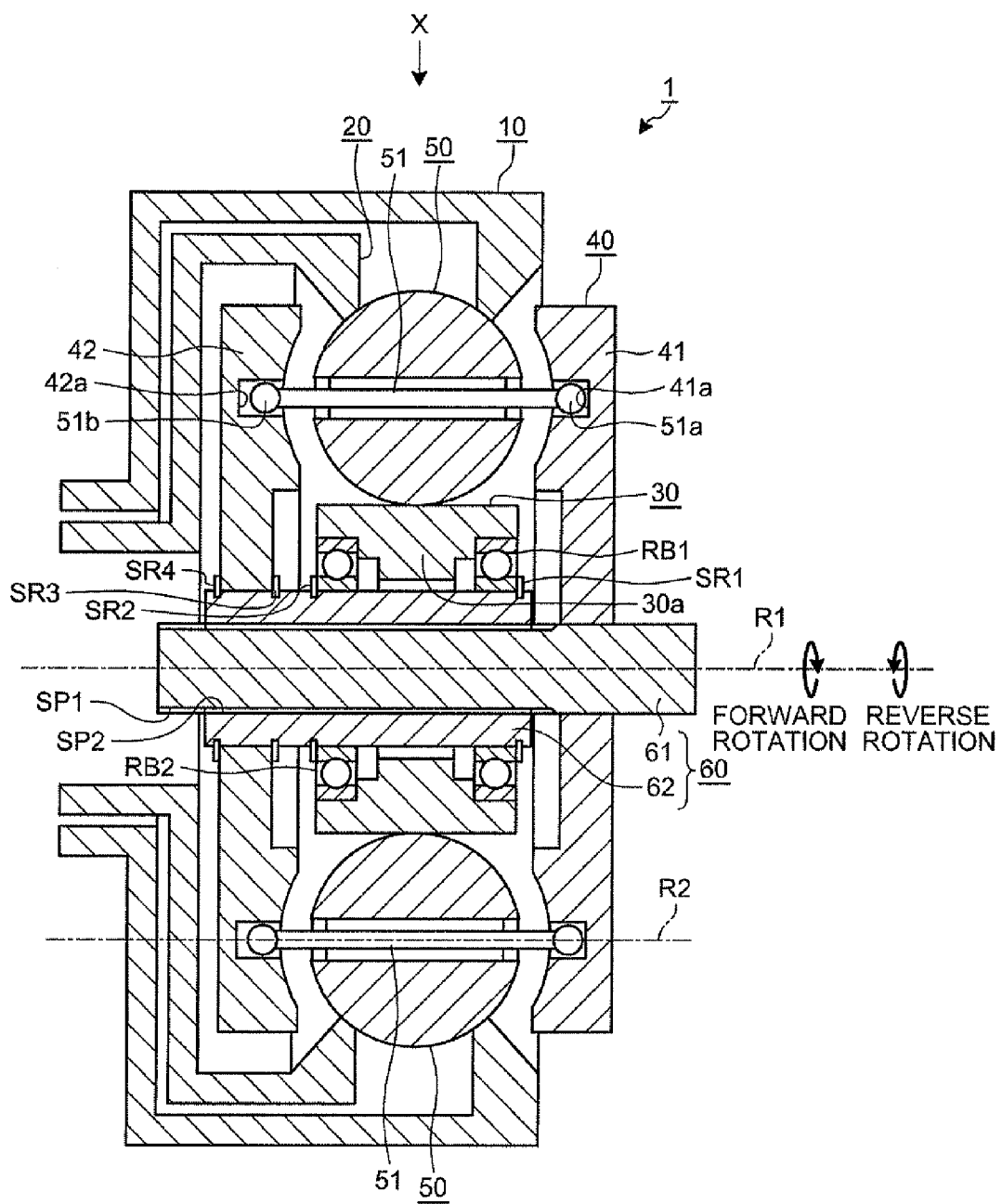
FIG. 1 is a partial cross-sectional view illustrating an example of a continuously variable transmission according to the present invention.

First, an example of the continuously variable transmission according to the embodiment will be described with reference to FIG. 1. Reference numeral 1 in FIG. 1 represents the continuously variable transmission according to the embodiment.

A continuously variable transmission mechanism, a main portion of the continuously variable transmission 1, is, what is called, a traction planetary mechanism. The continuously variable transmission includes: first to fourth rotating elements 10, 20, 30 and 40 having a common first rotation axis R1 and rotatable thereabout relative to one another; a plurality of fifth rotating elements 50, each having a separate second rotation axis R2 parallel to the first rotation axis R1 at a reference position to be discussed later; a shaft 60 arranged in the center of rotation of the first to fourth rotating elements 10, 20, 30 and 40, the shaft 60 serving as the rotation axis of the continuously variable transmission. The continuously variable transmission 1 changes the transmission ratio between input and output by tilting the second rotation axis R2 relative to the first rotation axis R1, thereby tilting the fifth rotating element 50. Unless otherwise stated below, the direction along which the first rotation axis R1 or the second rotation axis R2 extends is called an axial direction, while a direction about the first rotation axis R1 is called a circumferential direction. Also, a direction perpendicular to the first rotation axis R1 is called a radial direction, the inward direction is called a radial inward direction and the outward direction is called a radial outward direction. In the continuously variable transmission 1, any one of the first to fourth rotating elements 10, 20, 30, and 40 is fixed so that it does not rotate in a circumferential direction and the remaining rotating elements are rotatable in the circumferential direction.

In the continuously variable transmission 1, torque is transmitted between the first rotating element 10, the second rotating element 20, the third rotating element 30 and the fourth rotating element 40 via each of the fifth rotating elements 50. For example, in the continuously variable transmission 1, one of the first to fourth rotating elements 10, 20, 30, and 40 serves as a torque (power) input portion, and at least one of the remaining rotating elements serves as a torque output portion. For this reason, in the continuously variable transmission 1, the ratio of rotating speed (the number of revolutions) between any one of the rotating elements serving as an input portion and any of the rotating elements serving as an output portion is translated into a transmission ratio. For example, the continuously variable transmission 1 is arranged on a power transmission route of a vehicle. In this case, the input portion is connected to a power source side, such as an engine or a motor, and the output portion is connected to a drive wheel side. In the continuously variable transmission 1, rotational movement of each of the rotating elements, which occurs when torque is input to a rotating element serving as an input portion, is called forward drive; and rotational movement of each of rotating elements, which occurs when torque in a direction opposite to the forward drive is input to a rotating element serving as an output portion, is called reverse drive. For example, according to the foregoing example of the vehicle, the continuously variable transmission 1 has a forward drive, as in acceleration, when torque is input from the power source side to a rotating element serving as an input portion, thereby rotating the rotating element; and has a reverse drive, as in deceleration, when torque in the opposite direction to the forward drive is input from the driving wheel side to a running rotating element serving as an output portion.

In the continuously variable transmission 1, the plurality of the fifth rotating elements 50 are radially arranged around the axis (the first rotation axis R1) of the shaft 60. Each of the fifth rotating elements 50 is arranged such that it is sandwiched between the first rotating element 10 and the second rotating element 20 facing each other, and that it is arranged on the circumferential surface of the third rotating element 30. Also, each of the fifth rotating elements 50 rotates around its own rotation axis (the second rotation axis R2). Further, when the fourth rotating element 40 is not selected as the fixed rotating element, the fifth rotating element 50 rotates together with the fourth rotating element 40, revolving around the first rotation axis R1. The continuously variable transmission 1 generates a suitable frictional force (traction force) between the first to fourth rotating elements, 10, 20, 30 and 40, and the fifth rotating elements 50 by pressing at least one of the first and second rotating elements 10 and 20 against the fifth rotating element 50, thereby permitting a torque transmission therebetween. Also, the continuously variable transmission 1 changes the ratio of rotating speed (the number of revolutions) between input and output. To accomplish this, each of the fifth rotating elements 50 is tilted and rotated in a plane including its own second rotation axis R2 and the first rotation axis R1, and the ratio of rotating speed (number of revolutions) between the first rotating element 10 and the second rotating element 20 is changed.

Now, in the continuously variable transmission 1, the first and second rotating elements 10 and 20 function as a ring-gear in a planetary gear mechanism. Also, the third rotating element 30 functions as a sun roller in a traction planetary mechanism, and the fourth rotating element 40 functions as a carrier. Also, the fifth rotating element 50 functions as a ball-type pinion in a traction planetary mechanism. Hereinafter, the first and second rotating elements 10 and 20 will be called "first and second rotating members 10 and 20", respectively. Also, the third rotating element 30 will be called a "sun roller 30" and the fourth rotating element 40 will be called a "carrier 40". Also, the rotating element 50 will be called a "planetary ball 50". Details will be discussed below with reference to the case where the carrier 40 is the fixed element as described above.

The first and second rotating members 10 and 20 are disc members (discs) or annular members (rings) having the first rotation axis R1 around which they rotate. The first and second rotating members 10 and 20 are arranged so as to face each other in the axial direction with the planetary balls 50 therebetween. In this embodiment, both are disc members. Specifically, the first and second rotating members 10 and 20 have a round through hole in the center through which the shaft 60 is inserted. The first and second rotating members 10 and 20 are relatively rotatable in the circumferential direction relative to the shaft 60 via a thrust bearing (not shown), or the like. Also, the first and second rotating members 10 and 20 have a contact surface that touches the outer surface of each of the planetary balls 50 in a radial outward direction, which is described in detail later. For example, each of the contact surfaces is in the shape of a concave circular arc with a curvature that is equal to that of the outer surface of the planetary ball 50, in the shape of a concave circular arc with a curvature that is different from that of the outer surface, or in the shape of a convex circular arc or flat, etc. Here, the contact surfaces are formed such that the distances between the first rotation axis R1 and the corresponding contact surfaces of the planetary balls 50 are equal in a reference position to be described later, thereby the angles at which the first and second rotating members 10 and 20 are in contact with the corresponding planetary balls 50 are equal. The angle of contact as referred to here is the angle between the reference and the contact portion of each of the planetary balls 50. Here, the reference is established in a radial direction. Each of the contact surfaces makes a point or surface contact with an outer surface of the planetary ball 50. Also, each contact surface is formed such that when force is applied from the first and second rotating members 10 and 20 to the planetary ball 50 in the axial direction, force is applied to the planetary ball 50 at an angle in a radial inward direction and inclined direction. Meantime, in the continuously variable transmission 1 exemplified here, the first rotating member 10 is defined as an input side, and the second rotating member 20 is defined as an output side. The first rotating member 10 is connected to the power source side and the second rotating member 20 is connected to the driving wheel side.

The sun roller 30 is formed in the shape of a cylinder for rotation around the first rotation axis R1. The plurality of planetary balls 50 are arranged radially at substantially equal intervals on the outer surface of the sun roller 30. Therefore, the outer surface of the sun roller 30 serves as a rolling surface for each planetary ball 50 when each planetary ball 50 rotates around its own rotation axis. The sun roller 30 may permit each planetary ball 50 itself to roll (may permit each planetary ball 50 to rotate around its own rotation axis) by the rotating motion of the sun roller 30. In addition, the sun roller 30 may rotate in accordance with the rolling motion of each planetary ball 50 (the rotating motion of each planetary ball 50 around its own axis). Also, the sun roller 30 is provided with an annular portion 30a in the axially middle portion of its inner circumferential surface. The annular portion 30a has annular surfaces at both side ends perpendicular to the first rotation axis R1.

Here, the sun roller 30 is supported so as to be relatively rotatable in a circumferential direction with respect to the shaft 60 inserted in its annular portion 30a. The support is provided through radial bearings RB1 and RB2 arranged between the sun roller 30 and the shaft 60. The radial bearings RB1 and RB2 have outer rings (outer races) fitted into the inner circumferential surface of the sun roller 30. It is preferable that the annular side faces of the outer ring be in contact with the annular side faces of the annular portion 30a. Also, the radial bearings RB1 and RB2 have inner rings (inner races) fitted around the outer circumferential surface of the shaft 60 (specifically, a movable shaft 62 to be described later).

The sun roller 30 and the movable shaft 62 are restrained in axial shifting direction relative to each other by the radial bearings RB1 and RB2 fitted between the roller 30 and the movable shaft 62. In the continuously variable transmission 1, relative shifting-resistant members are used in order to reinforce this restraint. Here, snap rings SR1 and SR2, which are mounted on the outer circumferential surface of the movable shaft 62, are utilized as such members. The snap rings SR1 and SR2 are disposed in contact with the exposed side faces of the radial bearings RB1 and RB2 (fitted on the substantially annular side faces of the snap rings SR1 and SR2 projecting from the outer circumferential face of the movable shaft 62) so as to sandwich these exposed side faces.

The carrier 40 includes a first disc portion 41 and second disc portion 42 having the first rotation axis R1 as their axes and arranged to face each other in the axial direction. Each planetary ball 50 is arranged between the first and second disc portions 41 and 42. In the carrier 40, one of the first and second disc portions 41 and 42 is arranged over a stationary shaft 61, to be described later, of the shaft 60 and the other is arranged over the movable shaft 62. In the embodiment, the first disc portion 41 is mounted on the stationary shaft 61, and the second disc portion 42, on the movable shaft 62.

Here, the carrier 40 in the embodiment serves as a fixed element as described above, and does not allow each planetary ball 50 to rotate in a circumferential direction in such a way as to complete a revolution. On the other hand, in this embodiment, the carrier 40 is arranged so as to have the function of a transmission controlling section that forms the tilting-and-rolling mechanism for each of the planetary balls 50. Therefore, the first and second disc portions 41 and 42 need to be rotated relative to each other in a circumferential direction. In this carrier 40, therefore, one of the first and second disc portions 41 and 42 is mounted such that it does not rotate relative to the shaft 60 whereas the other disc is mounted such that it rotates relative to the shaft 60. Here, the first disc portion 41 is rotatable while the second disc 42 is not rotatable. In this embodiment, the stationary shaft 61 and the movable shaft 62 are arranged so as not to rotate relative to each other, and not to rotate in a circumferential direction of these shafts, either. Therefore, the first disc portion 41 is mounted via bearings (not shown), etc., such that circumferential rotation is possible relative to the stationary shaft 61. On the other hand, the second disc portion 42 is mounted such that circumferential rotation is not possible relative to the movable shaft 62. With such an arrangement, the carrier 40 is not able to complete a circumferential rotation relative to the shaft 60 as a whole unit, in such a way as to permit each of the planetary balls 50 to complete a revolution. However, between the first and the second disc portions 41 and 42, rotation relative to each other is possible in a circumferential direction.

Further, the first disc portion 41 is mounted on the stationary shaft 61 so as not to shift relative to the shaft in the axial direction. Also, the second disc portion 42 is mounted on the movable shaft 62 so as not to shift relative to the shaft in the axial direction. The shifting of the second disc portion 42 in the axial direction relative to the movable shaft 62 is restrained by fitting the second disc portion 42 over the movable shaft 62. In the continuously variable transmission 1, relative shifting-resistant members are disposed here also, in order to reinforce the restraint. Here, snap rings SR3 and SR4, which are mounted on the circumferential surface of the movable shaft 62, are used as such members. The snap rings SR3 and SR4 are disposed in contact with the annular side faces (projecting from the outer circumferential surface of the movable shaft 62) of the second disc portion 42 so as to sandwich these side faces. Here, the shaft 60 enables the stationary shaft 61 and the movable shaft 62 to move axially relative to each other. Accordingly, in the carrier 40, the first disc portion 41 and the second disc portion 42 also move axially relative to each other in accordance with a relative movement between the stationary shaft 61 and the movable shaft 62.

Each planetary ball 50 is a rolling member that rolls on the outer surface of the sun roller 30. It is preferable that the planetary ball 50 be completely spherical. However, the planetary ball 50 may be spherical in at least rolling direction. For example, it may have an elliptic cross section like a rugby ball. Each planetary ball 50 is freely rotatably supported by a support shaft 51 that runs through the center of the ball. For example, each planetary ball 50 is disposed so as to be rotatable (rotatable around its own axis) relative to the support shaft 51 having the second rotation axis R2 as its rotation axis, via a bearing (not shown) arranged between the planetary ball and the outer circumferential surface of the support shaft 51. Accordingly, each planetary ball 50 on the support shaft 51 rolls along the outer surface of the sun roller 30.

As shown in FIG. 1, a position serving as a reference position for each support shaft 51 is a position along which the second rotation axis R2 runs parallel to the first rotation axis R1. The support shaft 51 is swingable (tiltable) together with the planetary ball 50 between the reference position and a position tilted from the reference position, in a plane including its own rotation axis (the second rotation axis R2), which is defined in accordance with the reference position and the first rotation axis R1. The tilting rotation takes place in that plane, with the center of each planetary ball 50 serving as a fulcrum.

The continuously variable transmission 1 is provided with a transmission controlling section that changes speed by tilting each of the planetary balls 50. For example, as a transmission controlling section, one may be used that operates at least one projecting end of each of support shafts 51 projecting from the planetary balls 50 within the above-mentioned plane. In the continuously variable transmission 1, the carrier 40 is disposed so as to function as a transmission controlling section. This transmission controlling section includes: spherical bodies 51*a* and 51*b* provided at the corresponding projecting ends of the support shaft 51; each groove 41*a* formed in each first disc portion 41 for storing one spherical body 51*a*; each groove 42*a* formed in each second disc portion 42 for storing the other spherical body 51*b*; a drive device 52 (FIG. 2) that rotates at least one of the first and second disc portions 41 and 42 in a circumferential direction relative to the other. In the embodiment, the drive device 52 rotates the first disc portion 41.

Figure 2:
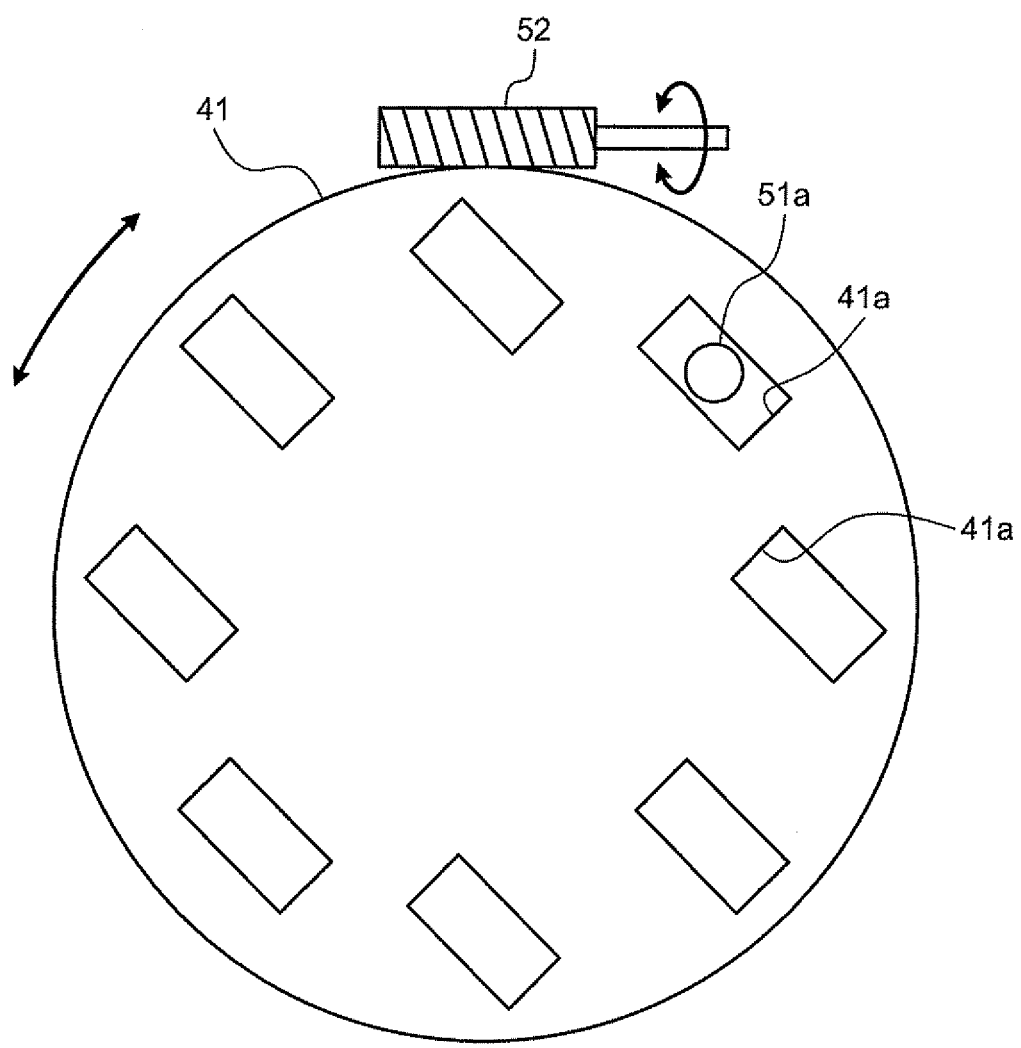
FIG. 2 is a view illustrating an example of a tilting-and-rolling mechanism for planetary balls.
Figure 3:
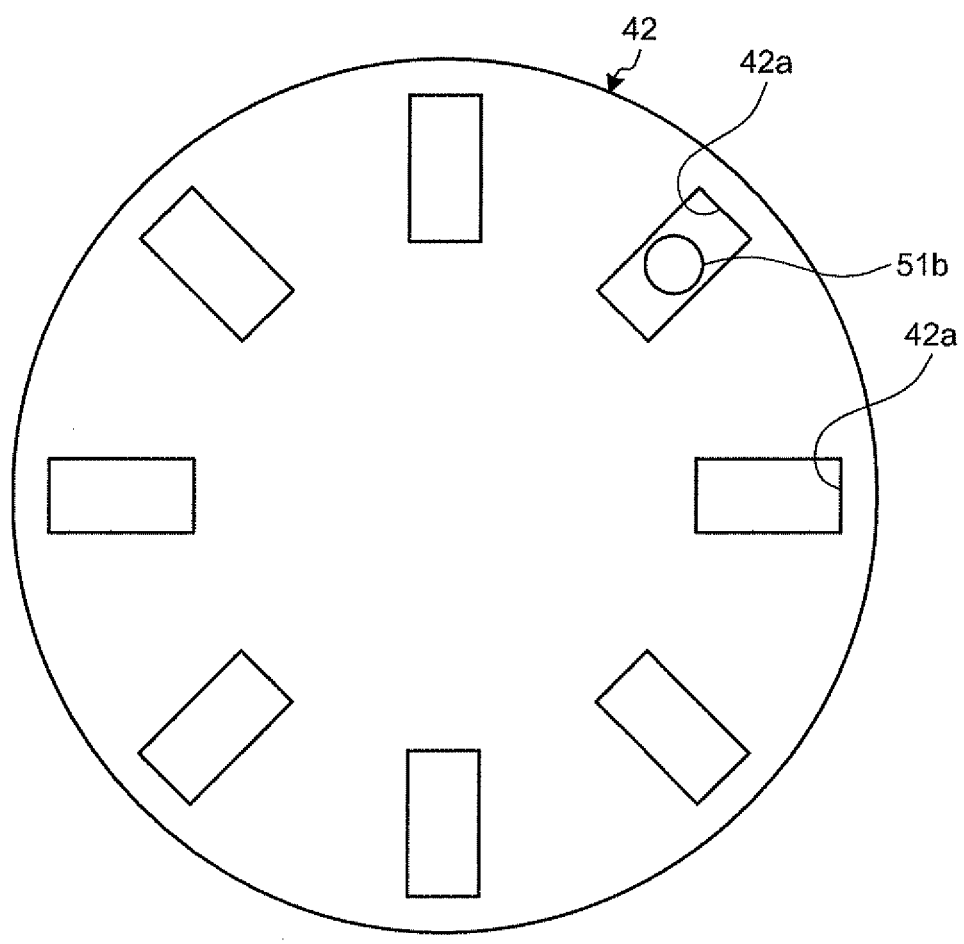
FIG. 3 is a view illustrating an example of a tilting-and-rolling mechanism for the planetary balls.

As shown in FIG. 2, each groove 41*a* of each first disc portion 41 is wider than the spherical body 51*a* and long according to the tilt angle of a planetary ball 50. The shape (such as arcuate or short rectangular shape) of the groove 41*a* is such that the groove guides the spherical body 51*a*, in accordance with the rotation of the first disc portion 41, in a longitudinal direction in the above-mentioned plane. In order to move the spherical body 51*a* in the above-mentioned plane, the groove 41*a* is tilted in a radial direction around the first rotation axis R1. On the other hand, as shown in FIG. 3, the groove 42*a* of the second disc portion 42 is wider than the spherical body 51*b* and long according to the tilt angle of the planetary ball 50. The shape (such as arcuate or rectangular shape) of the groove 42*a* is such that the groove guides the spherical body 51*b*, in accordance with rotation of the first disc portion 41, in a longitudinal direction in the above-mentioned plane. In order to move the spherical body 51*b* in the above-mentioned plane, the longitudinal direction of the groove 42*a* (i.e., the moving direction of the spherical body 51*b*) coincides with a radial direction around the first rotation axis R1. A pair of grooves 41*a* and 42*a* is provided for each of the planetary balls 50.

Also, the drive device 52 is a worm gear that engages with a threaded portion on the outer surface of each first disc portion 41, and there is an electronic control unit (ECU) that controls an electric motor for operating the worm gear. In the transmission controlling section, as one spherical body 51*a* (51*b*) moves downward in the drawing of FIG. 1, in accordance with the rotation of the first disc portion 41, the other spherical body 51*b* (51*a*) moves upward in the drawing of FIG. 1. Also, when the first disc portion 41 is rotated in reverse direction, each spherical body 51*a*, 51*b* moves upward or downward in reverse direction, respectively. As a result, in the continuously variable transmission 1, tilting force is applied to the support shaft 51 along the above-mentioned plane, thereby permitting the support shaft 51 to tilt together with the planetary balls 50.

Thus, each of the first and second disc portions 41 and 42 has a function as a tilt mechanism that tilts each of the planetary balls 50 via its support shaft 51. Each of the first and second disc portions 41 and 42 also has a function as a holding member that holds each of the planetary balls 50 via its support shaft 51.

The shaft 60 includes: a columnar or cylindrical stationary shaft 61 located in the center; and a cylindrical movable shaft 62 that is movable relative to the stationary shaft 61 in the axial direction. A spline SP1 is formed in the outer circumferential surface of the stationary shaft 61. On the other hand, a spline SP2 is formed in the inner circumferential surface of the movable shaft 62. The movable shaft 62 is spline-fitted over the stationary shaft 61 through the splines SP1 and SP2. Here, the splines SP1 and SP2 are formed in a shape such that the stationary shaft 61 and the movable shaft 62 are movable relative to each other in the axial direction.

In the continuously variable transmission 1, the first rotating member 10 and the second rotating member 20 rotates at the same rotating speed (the same number of revolutions) when the tilt angle of each of the planetary balls 50 is 0 degrees. At this point, the revolution ratio (the ratio of rotating speed or the number of revolutions) between the first rotating member 10 and the second rotating member 20 is 1. On the other hand, when each of the planetary balls 50 is tilted from the reference position, it changes the contact portion (contact point) of the first rotating member 10 and the contact portion (contact point) of the second rotating member 20. It also changes the distance from the central axis of the support shaft 51 to the contact portion of the first rotating member 10 as well as the distance from the central axis of the support shaft 51 to the contact portion of the second rotating member 20. As a result, one of the first and second rotating members 10 and 20 rotates at a higher speed than when it does at the reference position, and the other rotating member rotates at a lower speed. For example, when the planetary balls 50 are tilted in one direction, the second rotating member 20 rotates at a lower speed (deceleration) than the first rotating member 10. When the balls are tilted in the other direction, the second rotating member 20 rotates at a higher speed (acceleration) than the first rotating member 10. Accordingly, in the continuously variable transmission 1, by changing that tilt angle, the rotation ratio between the first rotating member 10 and the second rotating member 20 can be changed steplessly. Also, to increase speed, the upper planetary ball 50 in FIG. 1 is tilted counter-clockwise and the lower planetary ball 50 in FIG. 1 is tilted clockwise in the drawing. Also, to decrease speed, the upper planetary ball 50 in FIG. 1 is tilted clockwise and the lower planetary ball in FIG. 1, is tilted counter-clockwise in the drawing.

The continuously variable transmission 1 has a pressing portion (not shown) that generates sandwiching force between the first and second rotating members 10 and 20 and each of the planetary balls 50 by pressing at least one of the first and second rotating members 10 and 20 against each of the planetary balls 50. The pressing portion generates sandwiching force between them by generating force in an axial direction (pressing force). A suitable frictional force (traction force) occurs between them due to the sandwiching force, and therefore rotational torque from one of them, which is defined as an input side, is efficiently transmitted to the other. Also, the pressing force from the pressing portion is also transmitted to the sun roller 30 through each of the planetary balls 50 due to the shape of the contact surfaces of the first and second rotating members 10 and 20 and the outer surface of each of the planetary balls 50, and the positional relationship between them. As a result, a suitable frictional force (traction force) also is generated between the sun roller 30 and each planetary ball 50, and therefore rotational torque from one of them that serves as an input side is transmitted efficiently to the other. Accordingly, the pressing force should be large enough to maintain a torque transmission between the first rotating member 10 and second rotating member and 20 and the sun roller 30 by way of each of the planetary balls 50. For example, the pressing portion may be a drive source, such as an electrical actuator or hydraulic actuator, etc. The pressing portion may also be a mechanism, such as a torque cam, which generates pressing force in accordance with the rotation of the first or second rotating member 10, 20 to which such a mechanism is to be mounted.

In the continuously variable transmission 1, frictional force (traction force Ft) is generated between the first rotating member 10 and each of planetary balls 50 in accordance with rotation of the first rotating member 10. This causes each of the planetary balls 50 to start rotating around its own axis. And, in the continuously variable transmission 1, frictional force is also generated between each planetary ball 50 and the second rotating member 20, and between each planetary ball 50 and the sun roller 30, in accordance with the rotation of each planetary ball 50. This also causes the second rotating member 20 and the sun roller 30 to start rotating.

In the continuously variable transmission 1, frictional force occurs between the second rotating member 20 and each planetary ball 50 in accordance with rotation of the second rotating member 20. This causes each planetary ball 50 to start rotating around its axis. Additionally, in the continuously variable transmission 1, frictional force is also generated between each planetary ball 50 and the first rotating member 10, and between each planetary ball 50 and the sun roller 30, in accordance with rotation of each planetary ball 50. This also causes the first rotating member 10 and the sun roller 30 to start rotating.

In the continuously variable transmission 1, frictional force is generated between the sun roller 30 and each planetary ball 50 in accordance with the rotation of the sun roller 30. This causes each planetary ball 50 to start rotating around its axis. And, in the continuously variable transmission 1, frictional force occurs between each planetary ball 50 and the first rotating member 10, and also between each planetary ball 50 and the second rotating member 20, in accordance with the rotation of each planetary ball 50. This also causes the first rotating member 10 and the second rotating member 20 to start rotating.

Also, in the continuously variable transmission 1, where a rotating element other than carrier 40 is defined as a fixed element, and the carrier 40 is disposed so as to be rotatable relative to the shaft 60, each of the planetary balls 50 starts rotating and revolving around its own axis in accordance with the rotation of the carrier 40. Additionally, in the continuously variable transmission 1, frictional force is generated between each planetary ball 50 and the first rotating member 10, between each planetary ball 50 and the second rotating member 20, and also between each planetary ball 50 and the sun roller 30, in accordance with the rotation of each of the planetary balls 50. This causes the first and second rotating members 10 and 20 and the sun roller 30 to start rotating.

Figure 4:
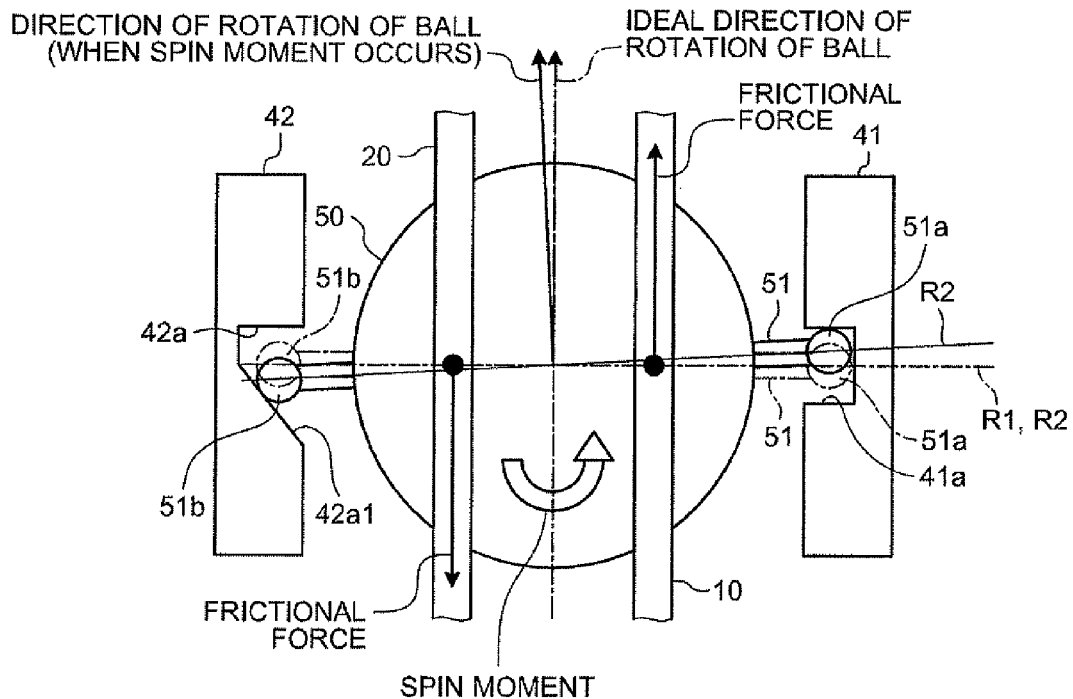
FIG. 4 is a conceptual view illustrating major portions only as viewed from the direction of arrow X in FIG. 1, and shows a status in which spin moment in one direction is generated on each planetary ball.

When the first rotating member 10 starts rotating, frictional force in a tangential direction which is the same direction as that of rotation of the first rotating member is applied to a portion of each planetary ball 50 in contact with the first rotating member 10. Additionally, the contact portion lies on the outer surface of each planetary ball 50 at a position shifted from the center of gravity of the planetary ball 50. As a result, the frictional force will be an eccentric load on the planetary ball 50. Thus, a rotation moment (hereinafter referred to as "spin moment") around the center of gravity occurs at the planetary ball 50 when the frictional force is applied thereto. Furthermore, as shown in FIG. 4, while the continuously variable transmission 1 is in operation, frictional force in opposite directions continually occurs at contact portions between each planetary ball 50 and the first rotating member 10, and between each planetary ball 50 and the second rotating member 20. For example, when the first rotating member 10 is defined as an input side and the second rotating member 20 is defined as an output side, frictional force in a tangential direction which is the same direction as that of rotation of the first rotating member 10 is generated at a portion in contact with the first rotating member 10. Additionally, frictional force in a tangential direction which is the opposite direction to that of rotation of the second rotating member is generated at a portion in contact with the second rotating member 20. As a result, a spin moment occurs at the planetary ball 50 around the center of gravity due to a difference in the direction of frictional force.

Figure 5:
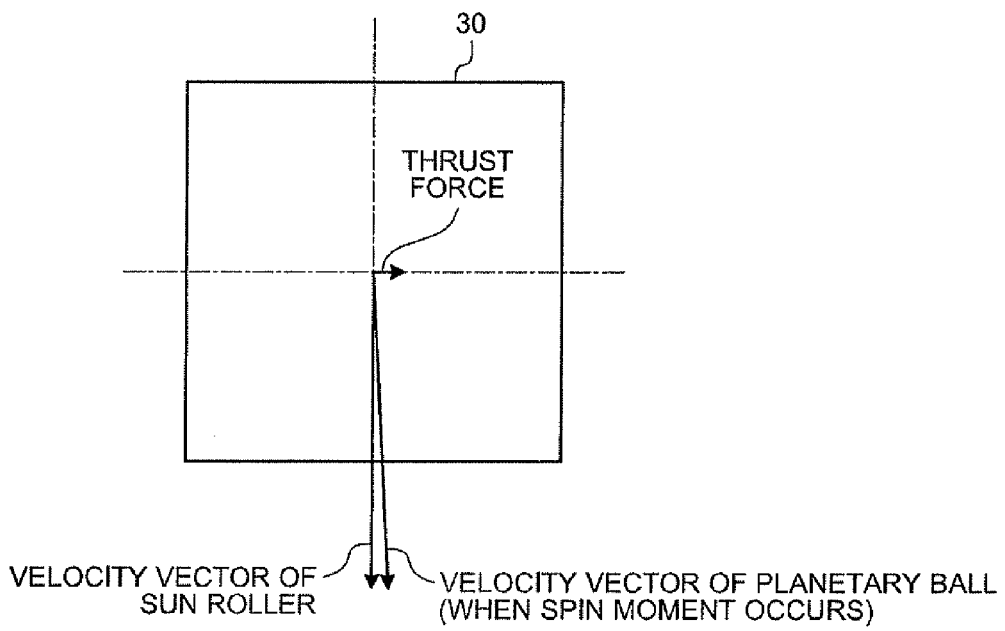
FIG. 5 is a view illustrating thrust force applied from each planetary ball to a sun roller when spin moment occurs.

In a case such as this, in the continuously variable transmission 1, in order to smooth the tilting and rolling of the planetary balls 50, a clearance is provided between the members that are moved when they tilt and roll. For example, in this embodiment, a clearance is provided between each of the spherical bodies 51a and 51b of the above-mentioned support shaft 51 and each of the grooves 41a and 42a formed in the first and second disc portions 41 and 42. Therefore, when spin moment occurs, the planetary ball 50 will be tilted by the amount corresponding to the clearance in the direction of the spin moment. That is to say, since spin moment does not run in the above-mentioned plane that includes the first rotation axis R1 and the second rotation axis R2, the second rotation axis R2 is moved out of the plane due to the clearance and the spin moment. As a result, the direction of rotation of each planetary ball 50 is tilted in accordance with the amount of tilt of the second rotation axis R2, as shown in FIG. 4. Therefore, the torque transmission efficiency deteriorates, compared to that in the ideal direction of rotation of each planetary ball. In this case, a skew occurs between the sun roller 30 and the planetary ball 50. Therefore, axial thrust force is applied from the planetary ball 50 to the sun roller 30 in accordance with the spin moment of the planetary ball 50, or, that is to say, in accordance with the difference in velocity vectors between the sun roller 30 and the planetary ball 50, as shown in FIG. 5. The direction of thrust force is determined by the direction of moment of spin. Further, a similar skew also occurs between the first and second rotating members 10 and 20, and the planetary ball 50. Accordingly, when spin moment occurs in the continuously variable transmission 1, the thrust force occurs between the sun roller 30 and each of the planetary ball 50 and between the first and second rotating members 10 and 20 and each of the planetary balls 50, with the result that the thrust force will be dissipated as heat and hence the torque transmission efficiency deteriorates. The drop in toque transmission efficiency may be reduced by making the clearance smaller, however, an excessively greater force is required to generate enough power to tilt and roll the planetary ball 50. This will then require a larger driving portion for the tilting-and-rolling mechanism, also requiring a larger continuously variable transmission 1.

Therefore, in the continuously variable transmission 1 according to the present embodiment, a ball rotating direction adjusting device is provided such as to suppress tilting of the rotation axis (the second rotation axis R2) of the planetary ball 50 when spin moment occurs, and make an adjustment so that the direction of rotation of the planetary ball 50 is closer to or coincides with the ideal direction of rotation of the ball.

For example, since counter-clockwise spin moment occurs when in forward drive (i.e., when torque is input to the first rotating member 10 and this member 10 is rotating in the direction of the torque), as shown in FIGS. 4 and 5, the planetary ball 50 tilts the support shaft 51 counter-clockwise while rotating. To bring the tilted second rotation axis R2 back to the ideal rotation axis (the second rotation axis R2 indicated by an alternate long and short dashed line in FIG. 4), the support shaft 51 should be pushed in a direction opposite to the direction of the tilt. Pushing force capable of achieving such pushing may be applied to the support shaft 51. Accordingly, a ball rotating direction adjusting device is provided with a pushing section that generates pushing force.

The pushing section pushes the support shaft 51 in a direction opposite to the direction of tilt in accordance with its own movement in the axial direction. The pushing section is set so as to bring the tilted second rotation axis R2 as close as possible to an ideal rotation axis before spin moment occurs. It is preferable that the pushing section be arranged so that the second rotation axis R2 continuously coincides with the ideal rotation axis while spin moment is occurring. Specifically, the pushing section should be arranged so as to apply pushing force to at least one of the projecting ends (here, the spherical bodies 51a and 51b) of the support shaft 51 to move the shaft in the above-described pushing direction. For example, an inclined surface is utilized as a pushing section so as to push the support shaft 51 in a direction opposite to the direction of tilt. The inclined surface is a contact surface with which the spherical body 51a (51b) comes into contact when the support shaft 51 tilts in accordance with spin moment. If the pushing section moves closer to the planetary ball 50 when spin moment occurs, the inclined surface is set in such a shape that it gradually pushes back the support shaft 51 in a direction opposite to the direction of tilt in accordance with the movement of the pushing section. On the other hand, if the pushing section moves away from the planetary ball 50 when spin moment occurs, the inclined surface may be set in such a shape that it gradually pushes back the support shaft 51 in a direction opposite to the direction of tilt in accordance with the movement of the pushing section.

Here, in the continuously variable transmission 1, when thrust force is applied from the planetary ball 50 to the sun roller 30, the thrust force is transmitted to the movable shaft 62 via the radial bearings RB1 and RB2 and the snap ring SR1. Accordingly, the movable shaft 62 moves relative to the stationary shaft 61 in the axial direction in accordance with the thrust force. The second disc portion 42 is disposed on this movable shaft 62 via the snap rings SR3 and SR4 so as to be integrally movable with the movable shaft 62 in the axial direction. Accordingly, in the continuously variable transmission 1, when thrust force is applied to the sun roller 30, the second disc portion 42 moves together with the movable shaft 62 in an axial direction in accordance with the thrust force. The movement of the second disc portion 42 is a radial movement relative not only to the first disc portion 41 but also to each of the planetary balls 50 and to the support shaft 51. For example, since thrust force is applied to the sun roller 30 from left to right as seen in the drawing when operating in forward drive, the second disc portion 42 moves closer to the first disc portion 41, each of the planetary balls 50, and the support shaft 51. In the continuously variable transmission 1, the sun roller 30, radial bearings RB1 and RB2, snap rings SR1 to SR4, the movable shaft 62, and the second disc portion 42, serve as thrust force transmitting section that transmits thrust force to the pushing section. Therefore, a ball rotational direction adjusting device will include the pushing section and the thrust force transmitting section.

The ball rotational direction adjusting device according to the present embodiment utilizes movement that takes place in accordance with the thrust force of the second disc portion 42. Moreover, the second disc portion 42 is provided with the above described pushing section. The second disc portion 42 already includes the groove 42a formed therein to serve as a contact surface where the support shaft 51 is contactable the spherical body 51b. Therefore, the pushing section utilizes the wall surface of the groove 42a. Here, the wall surface of the groove 42a with which the spherical body 51b comes into contact when spin moment occurs is tilted as shown in FIG. 4. A inclined surface 42a1 is utilized as a pushing section.

When operating in forward drive, as shown FIG. 6, the second disc portion 42 moves in the axial direction, indicated by arrow A, together with the movable shaft 62, which is the movable member of the pushing section, and approaches each of the planetary balls 50. The inclined surface 42a1 then pushes the spherical body 51b in a direction opposite to the direction of tilt of the support shaft 51 as it approaches each of the planetary balls 50. Accordingly, in the continuously variable transmission 1, it is possible for the second rotation axis R2 to be closer to or coincide with the ideal rotation axis. Therefore, it is possible for the direction of rotation of the planetary ball 50, which tilts as spin moment occurs, to be closer to or coincide with the ideal direction of ball rotation.

In the continuously variable transmission 1, by bringing the direction of rotation of the planetary ball 50 closer to the ideal direction of ball rotation, deviation of the second rotation axis R2 from the above-mentioned plane is lessened. This suppresses drop in torque transmission efficiency in forward drive operation. Also, in the continuously variable transmission 1, by causing the direction of rotation of the planetary ball 50 to coincide with the ideal direction of ball rotation, the second rotation axis R2 is kept within the above-mentioned plane. Thus, drop in torque transmission efficiency in forward drive operation is appropriately suppressed.

As described above, the continuously variable transmission 1 suppresses drop in torque transmission efficiency by suppressing the influence of spin moment. Further, in the continuously variable transmission 1, the pushing section is provided in the groove 42a of the existing second disc portion 42. Additionally, thrust force transmitting section also utilizes the existing sun roller 30, etc. Also, the pushing section does not narrow the clearance between the groove 42a and the spherical body 51b. Accordingly, the continuously variable transmission 1 can suppress drop in torque transmission efficiency without making the equipment size any larger.

Meanwhile, in this embodiment, the pushing section is arranged on the second disc portion 42. However, the pushing section may be arranged on a member other than the second disc portion 42. Even in such case, drop in torque efficiency can be suppressed appropriately. For example, as other member, a holding member may be separately provided that can hold the planetary ball 50 via the support shaft 51 and that is movable relative to the planetary ball 50 in the axial direction by a thrust force transmitted thereto.

Also, in this embodiment, the pushing section for forward drive operation has been described. However, the pushing section may be used for reverse drive operation (for input torque in a direction opposite to the direction of rotation of the second rotating member 20 in forward drive operation). When operating in reverse drive as shown in FIG. 7, spin moment occurs in a direction opposite to the direction of spin moment in forward drive operation. Therefore, thrust torque force applied from the planetary ball 50 to the sun roller 30 will also be in reverse direction. Therefore, the pushing section for reverse drive operation is provided on the first disc portion 41 that opposes the second disc portion 42. As a pushing section for reverse drive operation, an inclined surface 41a1 is utilized, the inclined surface as shown in FIG. 7 being an inclined wall surface of the groove 41a of the first disc portion 41 with which the spherical body 51a comes into contact when spin moment occurs in reverse drive operation. The inclined surface 41a1 is a wall surface located opposite to the inclined surface 42a1 in forward drive operation. But both have the same inclined angle. Also, in this case, the movable shaft 62 is extended to the first disc portion 41 side so that they can move integrally in the axial direction. In this case, as a pushing section to generate frictional force, a pushing section with a form different from that of the above-described pushing section provided on the first disc portion 41, is used.

As shown in FIG. 7, when operating in reverse drive, the first disc portion 41 moves together with the movable shaft 62 closer to each of the planetary balls 50 in the axial direction indicated by arrow B. Therefore, the inclined surface 41a1 pushes the spherical body 51a in the opposite direction to the direction of tilt of the support shaft 51 as it approaches each planetary ball 50. Accordingly, in the continuously variable transmission 1, it is possible for the second rotation axis R2 to be closer to or to coincide with the ideal rotation axis. Additionally it is also possible for the direction of rotation of the planetary ball 50, which tilts when spin moment occurs, to be closer to or coincide with the ideal direction of ball rotation. In the continuously variable transmission 1, by bringing the direction of rotation of the planetary ball 50 closer to the ideal direction of ball rotation, deviation of the second rotation axis R2 from the above-mentioned plane can be lessened. This suppresses drop in torque transmission efficiency in reverse drive operation. Also, in the continuously variable transmission 1, by causing the direction of rotation of the planetary ball 50 to coincide with the ideal direction of ball rotation, the second rotation axis R2 is kept within the above-mentioned plane. Thus, drop in torque transmission efficiency in reverse drive operation can be appropriately suppressed.

INDUSTRIAL APPLICABILITY

As described above, the continuously variable transmission according to the present invention is useful for a technology for suppressing drop in torque transmission efficiency.

REFERENCE SIGNS LIST

1 Continuously Variable Transmission
10 First Rotating Member (First Rotating Element)
20 Second Rotating Member (Second Rotating Element)
30 Sun Roller (Third Rotating Element)
40 Carrier (Fourth Rotating Element)
41 First Disc Portion
41a1 Inclined Surface
41a Groove
42 Second Disc Portion
42a1 Inclined Surface
42a Groove
50 Planetary Ball (Rolling Member, Fifth Rotating Element)
51 Support Shaft
51a, 51b Spherical Body
60 Shaft (Transmission Rotation Axis)
61 Stationary Shaft
62 Movable Shaft
R1 First Rotation Axis
R2 Second Rotation Axis
RB1, RB2 Radial Bearing
SP1, SP2 Spline
SR1-SR4 Snap Ring

The invention claimed is:
1. A continuously variable transmission, comprising:
first and second rotating elements that have a common first rotation axis and are arranged opposite to each other so as to be rotatable relative to each other;
a rolling member that is rotatably supported by a support shaft having a second rotation axis separate from the first rotation axis, and is sandwiched between the first and second rotating elements such that torque transmission is possible between the first and second rotating elements;
a transmission controlling section that changes a rotation ratio between the first and second rotating elements by tilting and rolling the rolling member;
a pushing section that is a contact surface in contact with the support shaft, the pushing section is tilted at an angle to a support shaft axial direction such that axial movement of the pushing section provides a thrust force to the support shaft changing the support shaft axial direction, the support shaft extends in the first rotation axis or the second rotation axis, the thrust force is opposite in direc- tion to a direction of tilt of the support shaft in accordance with a spin moment occurring at the rolling member; and a thrust force transmitting section that transmits, to the pushing section, the thrust force in the axial direction applied from the rolling member based on the spin moment occurring at the pushing section.

2. The continuously variable transmission according to claim 1, wherein the pushing section pushes the support shaft such that the second rotation axis is adjusted so as to coincide with an ideal rotation axis before the spin moment occurs.

3. The continuously variable transmission according to claim 1, wherein the thrust force transmitting section is relatively movable in an axial direction in accordance with the thrust force applied to the rolling member, and has a movable member capable of moving the pushing section integrally with the movable member in the axial direction.

4. The continuously variable transmission according to claim 1, comprising:
a third rotating element that has the first rotation axis, also has an outer circumferential surface serving as a rolling surface for a plurality of the rolling members radially arranged around the first rotation axis, and is rotatable relative to the first and second rotating elements; and
a fourth rotating element that has the first rotation axis and is rotatable relative to the first to third rotating elements, and permits each of the rolling member to rotate around the first rotation axis, wherein
any one of the first to fourth rotating elements is arranged so as not to be rotatable around the first rotation axis.

5. The continuously variable transmission according to claim 1, wherein the pushing section is provided on a holding member that holds the rolling member via the support shaft.

6. The continuously variable transmission according to claim 4, wherein a holding member that holds the rolling member via the support shaft is provided with the pushing section, and the fourth rotating element has the holding member.

7. The continuously variable transmission according to claim 2, wherein the thrust force transmitting section is relatively movable in an axial direction in accordance with the thrust force applied to the rolling member, and has a movable member capable of moving the pushing section integrally with the movable member in the axial direction.

8. The continuously variable transmission according to claim 1, wherein the thrust force transmitting section is relatively movable in an axial direction in accordance with the thrust force applied to the rolling member, and has a movable member capable of moving the pushing section integrally with the movable member in the axial direction.

9. The continuously variable transmission according to claim 2, further comprising:
a third rotating element that has the first rotation axis, also has an outer circumferential surface serving as a rolling surface for a plurality of the rolling members radially arranged around the first rotation axis, and is rotatable relative to the first and second rotating elements; and
a fourth rotating element that has the first rotation axis and is rotatable relative to the first to third rotating elements, and permits each of the rolling member to rotate around the first rotation axis, wherein
any one of the first to fourth rotating elements is arranged so as not to be rotatable around the first rotation axis.

10. The continuously variable transmission according to claim 1, further comprising:
a third rotating element that has the first rotation axis, also has an outer circumferential surface serving as a rolling surface for a plurality of the rolling members radially arranged around the first rotation axis, and is rotatable relative to the first and second rotating elements; and
a fourth rotating element that has the first rotation axis and is rotatable relative to the first to third rotating elements, and permits each of the rolling member to rotate around the first rotation axis, wherein
any one of the first to fourth rotating elements is arranged so as not to be rotatable around the first rotation axis.

11. The continuously variable transmission according to claim 3, further comprising:
a third rotating element that has the first rotation axis, also has an outer circumferential surface serving as a rolling surface for a plurality of the rolling members radially arranged around the first rotation axis, and is rotatable relative to the first and second rotating elements; and
a fourth rotating element that has the first rotation axis and is rotatable relative to the first to third rotating elements, and permits each of the rolling member to rotate around the first rotation axis, wherein
any one of the first to fourth rotating elements is arranged so as not to be rotatable around the first rotation axis.

12. The continuously variable transmission according to claim 2, wherein the pushing section is provided on a holding member that holds the rolling member via the support shaft.

13. The continuously variable transmission according to claim 1, wherein the pushing section is provided on a holding member that holds the rolling member via the support shaft.

14. The continuously variable transmission according to claim 3, wherein the pushing section is provided on a holding member that holds the rolling member via the support shaft.

15. The continuously variable transmission according to claim 4, wherein the pushing section is provided on a holding member that holds the rolling member via the support shaft.

* * * * *